UNITED STATES PATENT OFFICE.

FRANZ A. RODY AND HARVEY M. BURKEY, OF NEWARK, NEW JERSEY.

TREATMENT OF FELDSPAR, LEUCITE, AND THE LIKE.

1,151,498.   Specification of Letters Patent.   Patented Aug. 24, 1915.

No Drawing.   Application filed October 11, 1913. Serial No. 794,599.

*To all whom it may concern:*

Be it known that we, FRANZ A. RODY, a subject of the Emperor of Germany, and HARVEY M. BURKEY, a citizen of the United States, residing at Newark, county of Essex, State of New Jersey, have invented certain new and useful Improvements in the Treatment of Feldspar, Leucite, and the like; and we do hereby declare the following to be a full, clear, and exact description of the invention, such as will enable others skilled in the art to which it appertains to make and use the same.

In an application for Letters Patent of the United States, filed of even date herewith, by one of us, is described and claimed a method of treating feldspar, leucite, and like silicates containing alkali and alumina, by means of an alkali-earth metal oxid, in such proportions as to bind the silica as an alkali-earth metal silicate, and to release the alkali and alumina in water-soluble form. The treatment is effected at a sintering heat and, to produce quantitative results, requires, when lime is used as the alkali-earth metal compound, that it be present in the proportion of two molecules of calcium oxid to one molecule of silica. In nearly all of the natural silicates carrying alumina and alkali (as, for instance, feldspar and leucite), the proportion of the alkali to the alumina is such that, in the sintering incident to the practice of the process, the aluminate present is in the form of a mono-alkali aluminate, *i. e.*, for each molecule of alkali there is one molecule of alumina present, or substantially so.

The present invention constitutes an improvement upon, or modification of, the process referred to, and involves a reduction of at least one-half of the quantity of re-agent required for the conversion. This result is accomplished by substituting, in the mixture, for a part of the lime, a quantity of alkali. The alkali which, in addition to the lime, is employed in the mixture, may be, for instance, carbonate of sodium, and we prefer and intend to have present in the mixture, two molecules of alkali for each molecule of alumina, and one molecule of calcium oxid for each molecule of silica. This mixture is heated to a sintering temperature, crushed, boiled with water, and the alkali and alumina are separated as alkali aluminate, by filtration, or otherwise.

The alkali aluminate may then be recovered from the solution in any of the well-known ways, and a portion of it may be used (either with or without carbonate of sodium or other additional alkali) for mixing with the crushed feldspar, leucite, or the like of a new batch, together with the necessary proportion of calcium oxid.

It will be understood that the alkali-earth oxid employed may be derived from any suitable source, as, for instance, from lime-stone, dolomite, or the like, calcined or uncalcined, or from any alkali-earth metal salt (as, for instance, calcium chlorid or magnesium chlorid) decomposable within the mixture to form an alkali-earth metal oxid. If, for instance, calcium chlorid is employed for producing calcium oxid throughout the mass, the mixture, containing the calcium chlorid is first heated, at a low temperature, in the presence of steam, thereby forming calcium oxid and hydrochloric acid. Thereupon, the mixture, which comprises the crushed feldspar, leucite, or other silicate carrying the alkalis and alumina to be recovered, and which likewise comprises the calcium oxid and the addition of alkali, is raised in temperature to a sintering heat, and the resulting agglomerate is treated for the recovery of the alkali aluminate, as hereinbefore set forth.

While we prefer, in the practice of the invention, a ratio of alumina to alkali of 1:2, we have also obtained good results when the ratio of alumina to alkali was as 1:3, and, accordingly, we do not limit ourselves to the former ratio. Indeed, the discovery upon which the present invention is founded may be stated broadly as follows; that when to the amount of alkali already present in the feldspar, leucite or other silicate to be treated, is added a further quantity of alkali sufficient to form in the product of the sintering operation an alkali aluminate of higher basicity than the mono-salt, the quantity of lime or other alkali-earth metal oxid required to bind the silica is less than one-half of that required when lime alone is employed in the mixture.

Instead of recovering by condensation the hydrochloric acid given off in the preliminary heat treatment, hereinbefore referred to, it may to advantage be conducted direct in the vaporous condition into the moist residue left from the lixiviation of the sintered mass, for the purpose of forming calcium chlorid therein, as hereinbefore explained.

What we claim is:—

1. The method of recovering alkalis and alumina from feldspar, leucite and other silicates containing them, which comprises bringing to a sintering temperature a mixture containing the silicate together with additional alkali and an alkali-earth metal oxid or carbonate, the additional alkali being supplied in such quantity that with the alkali already present, a water-soluble alkali aluminate of higher basicity than the mono-salt, will be formed, while the alkali-earth metal will unite with the silica to form a mono-alkali-earth silicate; substantially as described.

2. The method of recovering alkalis and alumina from feldspar, leucite and other silicates containing them, which comprises bringing to a sintering temperature a mixture containing the silicate together with additional alkali and calcium oxid, the additional alkali being supplied in such quantity that with the alkali already present a water-soluble alkali aluminate of higher basicity than the mono-salt will be formed, while the calcium will unite with the silica to form mono-calcium silicate; substantially as described.

3. The method of recovering alkalis and alumina from feldspar, leucite and other silicates containing them, which comprises bringing to a sintering temperature, a mixture containing the silicate together with additional alkali and calcium oxid, the additional alkali being supplied in such quantity that the ratio of the alumina to the total alkali present in the mixture shall be at least as great as 1:3; substantially as described.

4. The method of recovering alkalis and alumina from feldspar, leucite and other silicates containing them, which comprises bringing to a sintering temperature a mixture containing the silicate together with additional alkali and calcium oxid, the additional alkali being supplied in such quantity that the ratio of the alumina to the total alkali present in the mixture shall be substantially as 1:2; substantially as described.

In testimony whereof we affix our signatures, in presence of two witnesses.

FRANZ A. RODY.
HARVEY M. BURKEY.

Witnesses:
E. E. DOUGHERTY,
C. W. WEB.